(12) United States Patent
Magiera et al.

(10) Patent No.: US 9,121,488 B2
(45) Date of Patent: Sep. 1, 2015

(54) HUB NUT FOR A PLANETARY TRANSMISSION AND PLANETARY TRANSMISSION

(71) Applicant: Robert Bosch GmbH, Stuttgart (DE)

(72) Inventors: Markus Magiera, Gevelsberg (DE); Dietmar Bronheim, Witten (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/028,845

(22) Filed: Sep. 17, 2013

(65) Prior Publication Data

US 2014/0087914 A1   Mar. 27, 2014

(30) Foreign Application Priority Data

Sep. 21, 2012  (DE) .......................... 10 2012 018 715

(51) Int. Cl.
| | |
|---|---|
| F16H 48/06 | (2006.01) |
| F16H 57/023 | (2012.01) |
| F16B 37/00 | (2006.01) |
| B60K 17/04 | (2006.01) |
| F16H 1/46 | (2006.01) |
| F16H 57/029 | (2012.01) |

(52) U.S. Cl.
CPC ............ *F16H 57/023* (2013.01); *B60K 17/043* (2013.01); *F16B 37/00* (2013.01); *F16H 1/46* (2013.01); *F16H 57/029* (2013.01)

(58) Field of Classification Search
CPC ....... F16H 57/023; F16H 1/46; F16H 57/029; B60K 17/043; F16B 37/00
USPC ........... 475/331, 150, 220; 411/190; 384/589, 384/15, 130, 151
See application file for complete search history.

(56) References Cited

U.S. PATENT DOCUMENTS

| | | | | |
|---|---|---|---|---|
| 6,017,097 | A * | 1/2000 | Weir, III .................... | 301/105.1 |
| 6,543,858 | B1 * | 4/2003 | Melton ......................... | 301/137 |
| 2004/0235609 | A1 * | 11/2004 | Chang ........................... | 475/331 |
| 2006/0035746 | A1 * | 2/2006 | Griggs et al. ................. | 475/331 |

FOREIGN PATENT DOCUMENTS

DE    60 2005 005 448 T2    4/2009

* cited by examiner

*Primary Examiner* — David J Hlavka
(74) *Attorney, Agent, or Firm* — Maginot, Moore & Beck LLP

(57) ABSTRACT

A hub nut for a planetary transmission has a body configured to secure against unscrewing and to seal the planetary transmission.

20 Claims, 4 Drawing Sheets

HUB NUT FOR A PLANETARY TRANSMISSION AND PLANETARY TRANSMISSION

This application claims priority under 35 U.S.C. §119 to patent application no. DE 10 2012 018 715.7, filed on Sep. 21, 2012 in Germany, the disclosure of which is incorporated herein by reference in its entirety.

BACKGROUND

The present disclosure relates to a hub nut for a planetary transmission and to a planetary transmission.

Planetary transmissions are known from DE 60 2005 005 448 T2. Here, a sun wheel on a sun wheel shaft and a planet spider with planet wheels are arranged within an annulus.

Planetary transmissions are used as travel transmissions for frequent and infrequent travelers, for example. In such planetary transmissions, however, there is generally a large number of different rotation seals with different geometrical dimensions on the annulus for securing and sealing. In this way, the annulus and, if appropriate, other parts of the planetary transmission can be adapted to the respective rotation seal to be used.

Moreover, an additional static sealing element, e.g. an O-ring or other flexible seals, has to be used on the annulus for a main bearing. For this purpose, an additional design element is generally required in the annulus, e.g. a groove in the annulus. As a result, a large number of complex processing steps is necessary.

Moreover, an additional securing element, e.g. a cylindrical pin, an adhesive etc., is generally required to secure the main bearing on the annulus. An additional design element, e.g. a hole, is required in the annulus for the cylindrical pin. When using an adhesive, dosing is problematic. As a result, problems also arise with cleanliness. Thus, the securing means gives rise to additional complex processing steps that cause problems.

Overall, a great variety of parts in the assembly process and a complex adjustment process in the assembly of the transmission are required with current planetary transmissions. In particular, time-consuming measurement and grinding of adjusting washers for adjusting the main bearings also has to be carried out. Moreover, it would be particularly desirable to ensure that the bearings could be assembled as part of the modular structure in the case of a broached annulus. By this means too, it is possible to avoid errors in assembly, such as not installing an O-ring, installing the wrong size of O-ring, incorrect installation of the O-ring in respect of its position or twisting, incorrect dosing of the adhesive, incorrect type of adhesive, application of adhesive omitted, or inadequate cleanliness of the parts because swarf, grease and other dirt are present.

It is therefore the object of the present disclosure to provide a hub nut for a planetary transmission and a planetary transmission by means of which it is possible to solve the above-mentioned problems. In particular, the aim is to provide a hub nut for a planetary transmission and a planetary transmission in which different nominal sizes can be installed in a simple and more robust manner and with fewer processing steps than hitherto, thus resulting in a reduction in costs and a more stable assembly process.

SUMMARY

This object is achieved by a hub nut for a planetary transmission having the features of the disclosure and a planetary transmission having the features of the disclosure.

Advantageous further embodiments of the hub nut and of the planetary transmission are indicated in the dependent patent claims.

With the hub nut, a combination of the following functions is possible in a single component: axially securing the main bearing unit, receiving the rotation seal, and thread coating as a means of securing against unscrewing and sealing, offering sealing or separation of the media oil and air. In this way, adaptation of the various requirements resulting from the different nominal sizes and modules is possible without having to change the A-class components, such as the annulus etc.

In the case of the hub nut, the body is, in particular, configured in such a way that there is support and fixing in the axial direction for a main bearing unit in the annulus. Moreover, the body has a sealing function. As a result, a securing function as a means of securing against unscrewing for the axial fixing of the main bearing units and a sealing function for the transmission with respect to the outside are provided as a solution to the abovementioned problem which is economical, involves a reliable process, is functionally reliable and is relatively simple.

The following advantages, in particular, are thereby obtained. There is no longer a need for an additional static sealing element, e.g. an O-ring or other flexible seals. As a result, an additional design element in the annulus, e.g. a groove in the annulus, is also eliminated. Thus, fewer parts and processing steps are required. Moreover, there is also no need for an additional securing element, e.g. a cylindrical pin, adhesive etc. This too eliminates an additional design element in the annulus, e.g. a hole for the cylindrical pin in the annulus or the application of the adhesive with the associated problems. This too means that fewer parts and processing steps are required.

Overall, the hub nut and the planetary transmission provided therewith offer logistical advantages by reducing the number of design elements and providing a more stable assembly process through a reduction in the possibility of error. Reducing the design elements has effects on the complexity of the parts list. In summary, the resulting tooling costs are lower. Moreover, more robust assembly through the elimination of a pliable sealing element, such as the sealing ring or O-ring, and a more stable assembly process through preparation of the element outside the assembly process are possible.

Further possible implementations of the disclosure also include combinations of features or embodiments that are not explicitly cited but are described above or below in connection with the illustrative embodiments. At the same time, a person skilled in the art will also add individual aspects as improvements or supplementary features to the respective basic form of the disclosure.

BRIEF DESCRIPTION OF THE DRAWINGS

The disclosure is described in greater detail below with reference to the attached drawings and by means of illustrative embodiments. In the drawings.

In the figures, elements which are identical or functionally identical are provided with the same reference signs, unless indicated otherwise.

DETAILED DESCRIPTION

Figure 1:
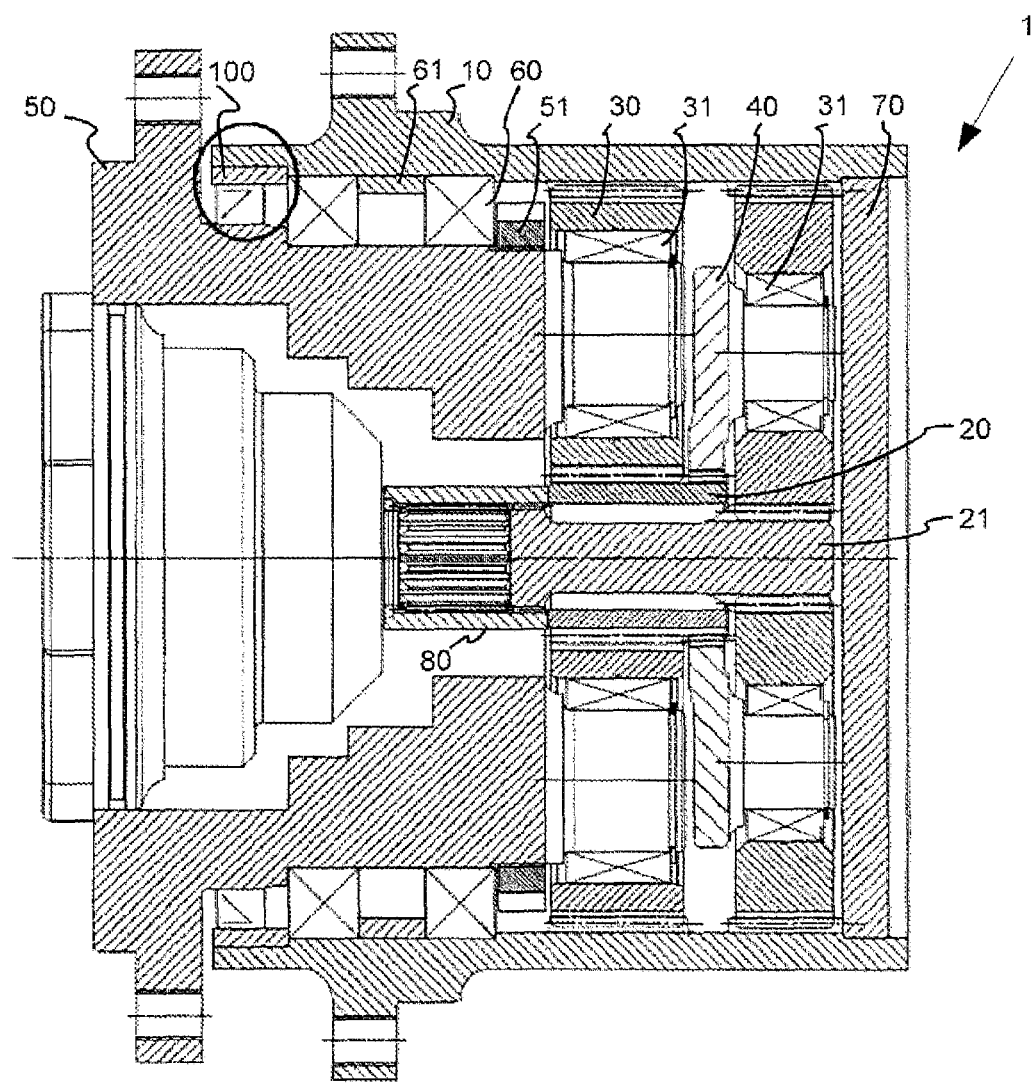
FIG. 1 shows a sectional view of a planetary transmission having a hub nut in accordance with a first illustrative embodiment.

FIG. 1 shows a planetary transmission 1 having an annulus 10, a sun wheel 20, a sun wheel shaft 21, a planet wheel 30, a planet bearing 31, a planet carrier or planet spider 40, a supporting axle 50, a shaft nut 51, a main bearing unit 60, an intermediate element 61, which is, for example, an intermediate ring, a cover 70, a driver 80, an anti-rotation safeguard 90 and a hub nut 100. The sun wheel shaft 21 and/or the planet spider 40 with the planet spider journal 41 can be moved relative to the cover 70. Moreover, the sun wheel 20 and the sun wheel shaft 21 can be moved relative to one another.

In FIG. 1, the hub nut 100 is mounted between the anti-rotation safeguard 90 and the annulus 10. Here, the hub nut 100 is arranged in such a way that it secures the main bearing unit 60 in the axial direction. The main bearing unit 60 serves to support the annulus 10 on the supporting axle 50.

Figure 2:
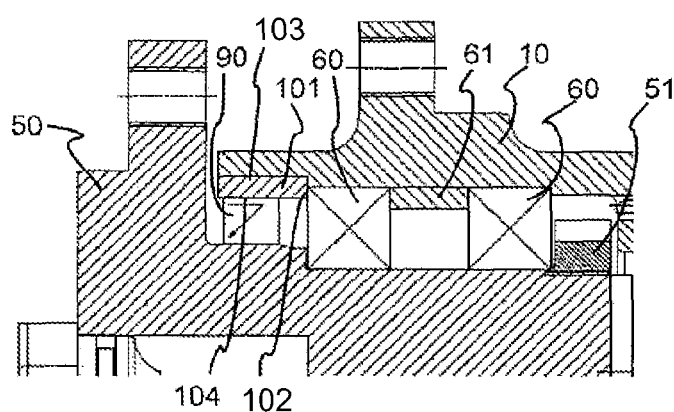
FIG. 2 shows a detail view of the planetary transmission having the hub nut in accordance with the first illustrative embodiment.

As can be seen from FIG. 2, the hub nut 100 has a body 101. For securing the main bearing unit 60, the hub nut 100 has a contact region 102, at which the main bearing unit 60 rests on the hub nut 100. Moreover, the hub nut 100 has a coated region 103, which is arranged on the annulus 10. In addition, the hub nut 100 has a receiving region 104, on which the anti-rotation safeguard 90 is received.

The coated region 103 serves as a means of securing against unscrewing and of sealing the planetary transmission 1.

The hub nut 100 is substantially rectangular. Thus, the contact region 102 is arranged substantially transversely to the coated region 103. The receiving region 104 is arranged substantially parallel to the coated region 103.

By means of the hub nut 100, an additional adjusting process during transmission assembly can be eliminated. No time-consuming measurement and grinding of adjusting washers for adjusting the main bearing unit 60 is required. Moreover, the suitability of the main bearing unit 60 for installation as part of the modular structure in the case of a broached annulus 10 is ensured. Only a unilateral assembly sequence is possible, and therefore an additional process of turning the annulus 10 during the assembly process is no longer necessary.

Moreover the hub nut 100 is an integral construction element of compact design. As a result, the interface between a support ring and the annulus 10 and the associated additional components in the prior art are eliminated.

By means of the hub nut 100, the main bearing unit 60 is supported and fixed in the axial direction in the annulus 10. Moreover, an additional degree of freedom for the insertion of various rotation seals with various geometrical dimensions is created without the need for a change in the A-class parts of the module, e.g. the annulus 10 etc.

In addition, it is possible to use rotation seals of the same dimensions across the range of transmission nominal sizes.

Owing to the design solution of a "broachable annulus" required by the modular principle, the direction of installation of the main bearing unit 60 is predetermined. The hub nut 100 ensures that the main bearing unit 60 can be installed under different boundary conditions, by virtue of the module.

Figure 3:
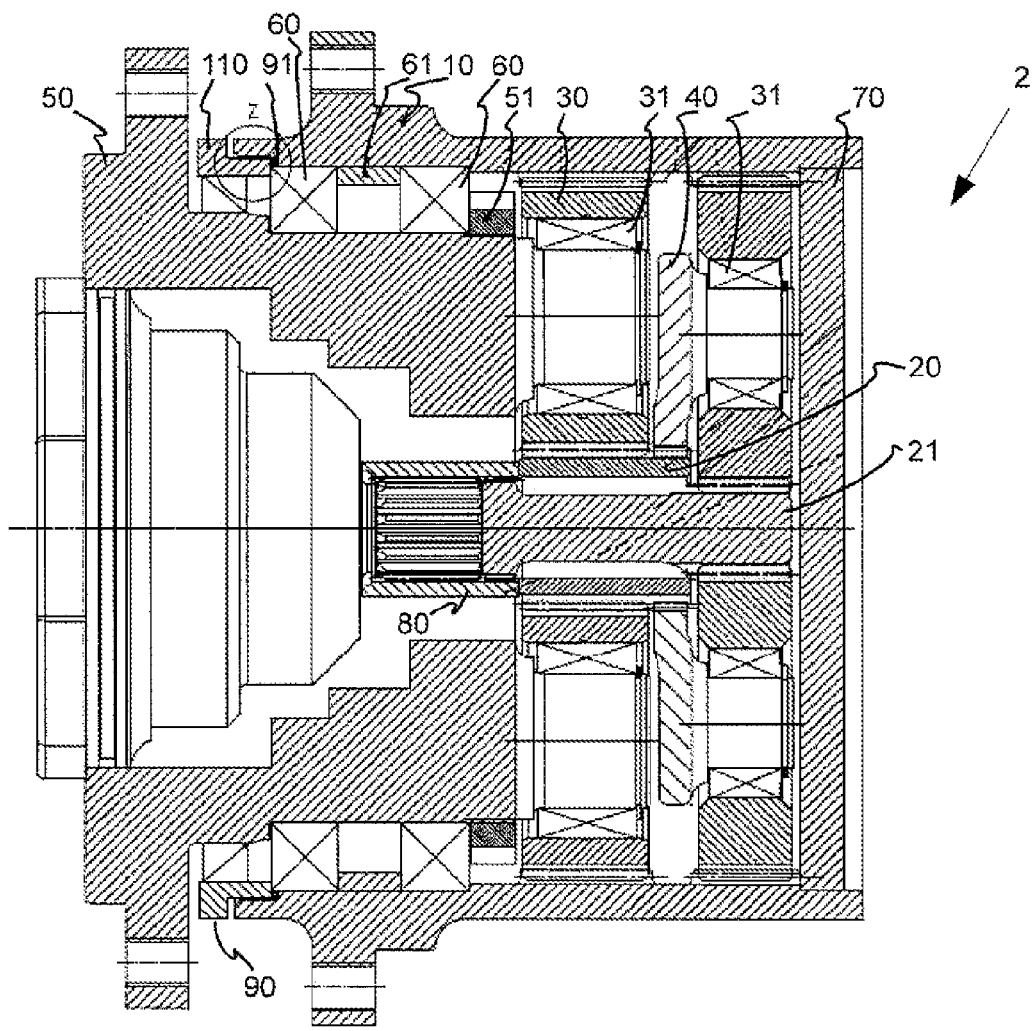
FIG. 3 shows a sectional view of a planetary transmission having a hub nut in accordance with a second illustrative embodiment.

FIG. 3 shows a planetary transmission 2 having a hub nut 110 in accordance with a second illustrative embodiment. In this illustrative embodiment, the hub nut 110 is of L-shaped configuration, wherein the hub nut 110 is once again arranged in such a way that it is arranged between the cavity 10 and the anti-rotation safeguard 90 and rests on the main bearing unit 60. A sealing element 91 is arranged between the hub nut 110 and the main bearing unit 60.

In other respects, the planetary transmission 2 in accordance with this illustrative embodiment is embodied in the same way as described in the case of the first illustrative embodiment.

Figure 4:
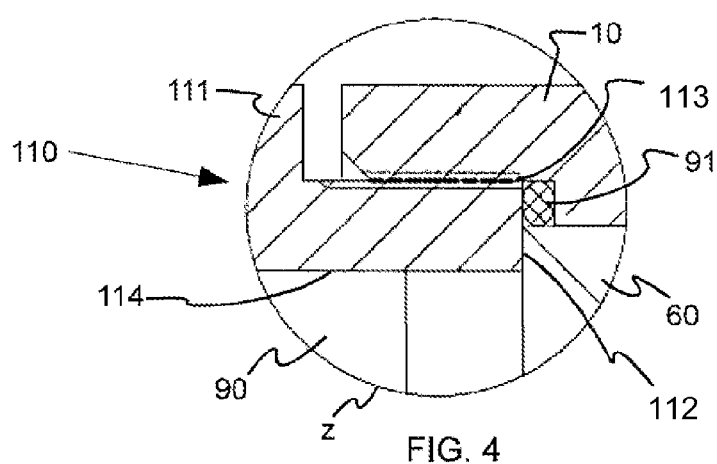
FIG. 4 shows a detail view of the planetary transmission having the hub nut in accordance with the second illustrative embodiment.

FIG. 4 shows the arrangement of the hub nut 110 on the annulus 10 of the main bearing unit 60 and the anti-rotation safeguard 90 in more detail. Once again, the hub nut 110 has a body 111 and a contact region 112 to enable the hub nut 110 to rest on the main bearing unit 60. The contact region 112 also serves to enable the hub nut 110 to rest on the sealing element 91, which can be an O-ring, for example. Moreover, the hub nut 110 has a coated region 113, in which the hub nut 110 rests on the annulus 10. The coated region 113 has the same function as the coated region 103 in the first illustrative embodiment. In addition, the hub nut 110 has a receiving region 114 for receiving the anti-rotation safeguard 90.

The hub nut 110 is substantially L-shaped. Here too, however, the contact region 112 is arranged substantially transversely to the coated region 113. The receiving region 114 is arranged substantially parallel to the coated region 113.

The planetary transmission 2 and the hub nut 110 in accordance with this illustrative embodiment achieve the same advantages as those mentioned above in relation to the first illustrative embodiment.

Figure 5:
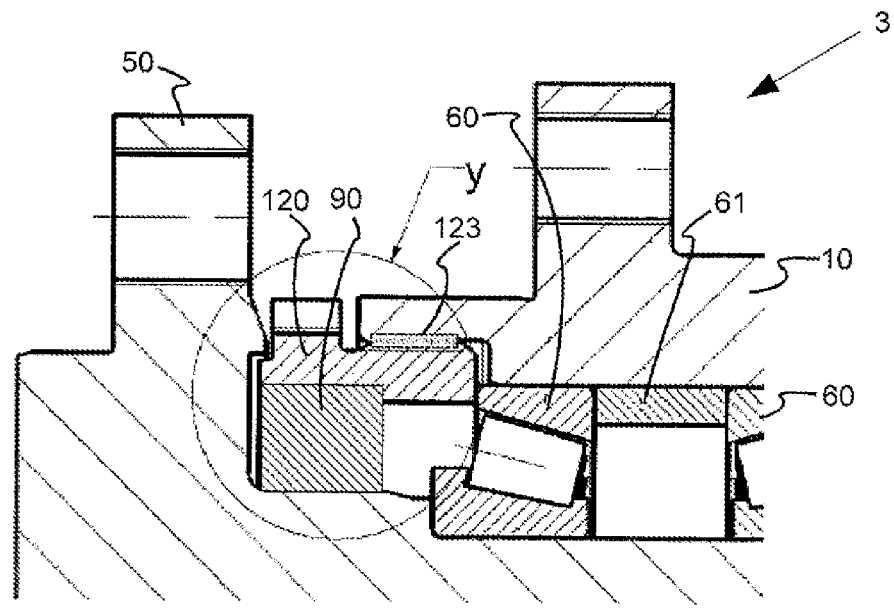
FIG. 5 shows a detail view of a planetary transmission having a hub nut in accordance with a third illustrative embodiment.

FIG. 5 shows a planetary transmission 3 having a hub nut 120 in accordance with a third illustrative embodiment. In this illustrative embodiment too, the hub nut 120 is arranged between the annulus 10 and the anti-rotation safeguard 90. Moreover, the hub nut 120 rests on the main bearing unit 60.

Figure 6:
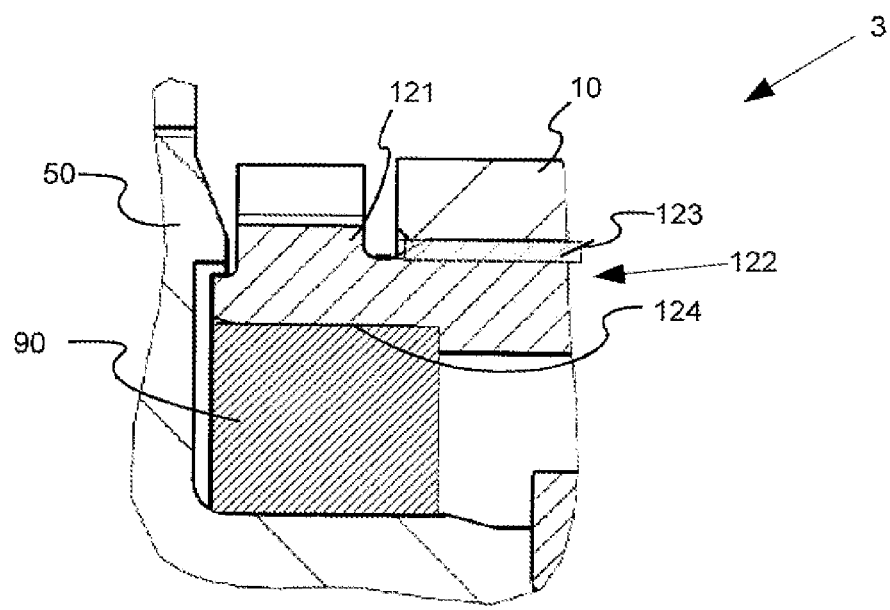
FIG. 6 shows a further detail view of the planetary transmission having a hub nut in accordance with the third illustrative embodiment.

FIG. 6 shows the arrangement of the hub nut 120 in the planetary transmission 3 in greater detail. The hub nut 120 has a body 121, a contact region 122, a coated region 123 and a receiving region 124. The contact region 122 is indicated only schematically in FIG. 6 and has the same function as described in the case of the first illustrative embodiment. The coated region 123 is arranged between the annulus 10 and the hub nut 120. The coated region 123 and the receiving region 124 have the same function as that described for the coated region 103 and the receiving region 104 in the case of the first illustrative embodiment.

In the case of the hub nut 120, a receiving region 124 for receiving the anti-rotation safeguard 90 is of offset design. The anti-rotation safeguard 90 is also received by the supporting axle 50. Here too, the contact region 122 is arranged substantially transversely to the coated region 123. The receiving region 124 is arranged substantially parallel to the coated region 123.

In other respects, the planetary transmission 3 in accordance with this illustrative embodiment is embodied in the same way as described in the case of the first illustrative embodiment.

The planetary transmission 3 and the hub nut 120 in accordance with this illustrative embodiment achieve the same advantages as those mentioned above in relation to the first illustrative embodiment.

Figure 7:
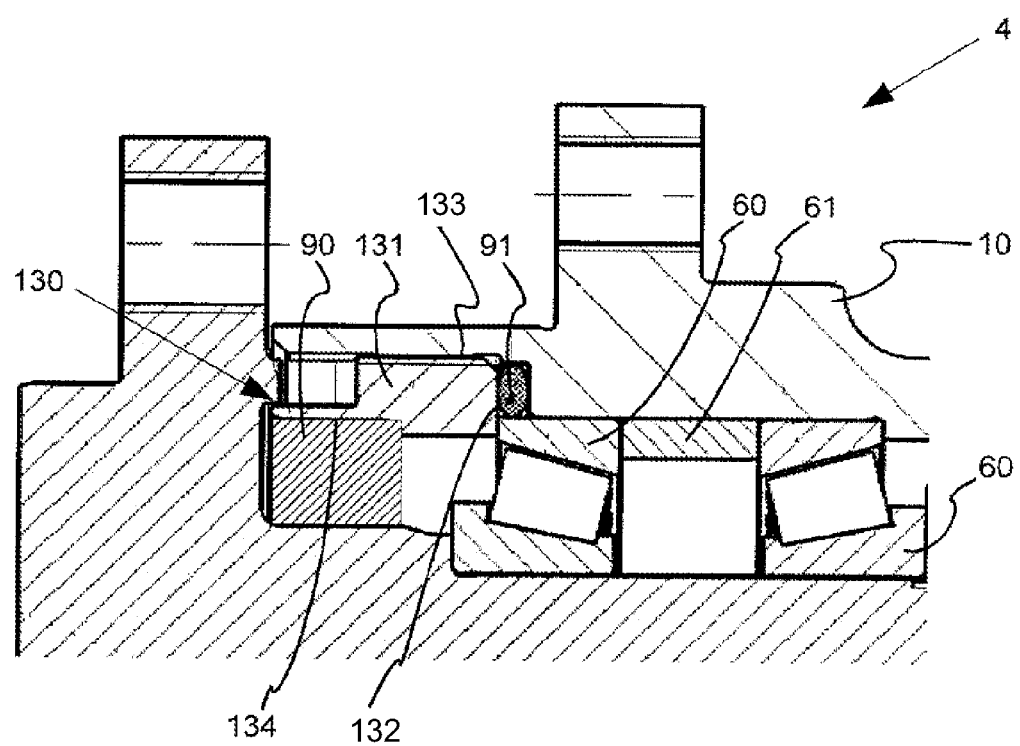
FIG. 7 shows a detail view of a planetary transmission having a hub nut in accordance with a fourth illustrative embodiment.

FIG. 7 shows part of a planetary transmission 4 having a hub nut 130 in accordance with a fourth illustrative embodiment.

In this illustrative embodiment too, the hub nut 130 is once again arranged between the annulus 10 and the anti-rotation safeguard 90. In this illustrative embodiment, there is once again an additional sealing element 91 between the hub nut 130 and the annulus 10. The main bearing unit 60 rests on a contact region 132 of the hub nut 130.

The hub nut 130 has a body 131, the contact region 132, a coated region 133 and a receiving region 134. The receiving region 134 serves to receive the anti-rotation safeguard 90. The coated region 133 and the contact region 132 have the same function as that described for the coated region 103 and the contact region 102 in the case of the first illustrative embodiment. Here too, the contact region 132 is arranged substantially transversely to the coated region 133. The receiving region 134 is arranged substantially parallel to the coated region 133.

The hub nut 130 in accordance with this illustrative embodiment is once again substantially L-shaped, wherein the receiving region 134 is offset here.

The planetary transmission 4 and the hub nut 130 in accordance with this illustrative embodiment achieve the same advantages as those mentioned above in relation to the first illustrative embodiment.

All the embodiments of the planetary transmission 1, 2, 3, 4 and of the hub nut 100, 110, 120, 130 which have been described above can be used individually or in all possible combinations. In particular, all the features and/or functions of the illustrative embodiments described above can be combined in any way. In addition, the following modifications, in particular, are conceivable.

The parts illustrated in the figures are shown schematically and may differ from the forms shown in the figures in the precise way in which they are embodied as long as their functions described above are ensured.

Using the hub nut 100, 110, 120, 130 in accordance with the illustrative embodiments described above, the use of high-productivity production processes is possible by virtue of effects such as bundling of production runs, in particular a broachable annulus. The use of the coated region 103, 113, 123, 133, which can also be referred to as hub nut thread coating, can extend across modules and nominal sizes.

The receiving region 104, 114, 124, 134 of the hub nut 100, 110, 120, 130 can be of offset design, as illustrated by a recess in FIG. 5 to FIG. 7. Here, the depth of the recess can be chosen to suit the requirements.

The hub nut 100, 110, 120, 130 in accordance with the illustrative embodiments described above can also be a threaded ring. The hub nut 100, 110, 120, 130 in accordance with the illustrative embodiments described above can be embodied as a thread coating in the coated region 103, 113, 123, 133.

The hub nut 100, 110, 120, 130 in accordance with the illustrative embodiments described above is preferably manufactured from metal, e.g. alloyed or unalloyed steel etc. The coated region 103, 113, 123, 133 of the hub nut 100, 110, 120, 113 in accordance with the illustrative embodiments described above is preferably coated with an adhesive sealing compound.

The sealing element 91 is installed in such a way that no additional groove is required in the annulus 10. For this purpose, the annulus 10 and the main bearing unit 60 are arranged in an appropriate manner relative to one another, thus creating the required installation space for the sealing element 91. Depending on the embodiment, it is also possible for the sealing element 91 to be omitted.

The planetary transmission 1, 2, 3, 4 in accordance with the first to fourth illustrative embodiments can be a travel and pivoting transmission for frequent and infrequent travel applications. The planetary transmission 1, 2, 3, 4 in accordance with the first to fourth illustrative embodiments can also be a winch transmission. The planetary transmission 1, 2, 3, 4 in accordance with the first to fourth illustrative embodiments can be a stationary transmission. The planetary transmission 1, 2, 3, 4 in accordance with the first to fourth illustrative embodiments can furthermore be a pitch and azimuth transmission for wind power plants. Moreover, the planetary transmission 1, 2, 3, 4 in accordance with the first to fourth illustrative embodiments can be any derivative special form of transmission.

What is claimed is:

1. A planetary transmission, comprising:
an annulus;
a supporting axle;
a main bearing unit supporting the annulus on the supporting axle; and
a hub nut having a body configured to secure against unscrewing and to seal the planetary transmission,
wherein the body engages the annulus;
wherein the body is arranged on the main bearing unit to axially fix the main bearing unit; and
wherein the body and annulus each have corresponding threads configured to mount the body to the annulus.

2. A planetary transmission, comprising:
an annulus;
a supporting axle;
a main bearing unit supporting the annulus on the supporting axle; and
a hub nut having a body configured to secure against unscrewing and to seal the planetary transmission,
wherein the body engages the annulus;
wherein the body is arranged on the main bearing unit to axially fix the main bearing unit;
wherein the body has a coated region that engages the annulus, the coated region configured to secure against unscrewing and to seal the planetary transmission; and
wherein the body has a contact region that contacts the annulus or at least one of a sealing element and the main bearing unit, the contact region arranged substantially perpendicular to the coated region.

3. The planetary transmission according to claim 2, further comprising:
an anti rotation safeguard,
wherein the body has a receiving region that receives the anti-rotation safeguard; and
wherein the receiving region is arranged substantially parallel to the coated region.

4. The planetary transmission according to claim 2, further comprising an anti-rotation safeguard, wherein the hub nut is arranged between the anti-rotation safeguard and the annulus.

5. The planetary transmission according to claim 2, wherein the hub nut is arranged next to the main bearing unit.

6. The planetary transmission claim 2, further comprising a sealing element arranged between the hub nut and the main bearing unit.

7. The planetary transmission according to claim 2, wherein the coated region is coated with an adhesive sealing compound.

8. The planetary transmission according to claim 1, wherein the body has a coated region that engages the annulus, the coated region configured to secure against unscrewing and to seal the planetary transmission.

9. The planetary transmission according to claim 1, wherein the threads of at least one of the body and the annulus have a coated region configured to secure against unscrewing and to seal the planetary transmission.

10. The planetary transmission according to claim 9, wherein the coated region is coated with an adhesive sealing compound.

11. The planetary transmission according to claim 2, wherein the contact region of the body contacts the annulus.

12. The planetary transmission according to claim 2, wherein the contact region of the body contacts the a sealing element.

13. The planetary transmission according to claim 2, wherein the contact region of the body contacts the main bearing unit.

14. The planetary transmission according to claim 1, wherein the body has a contact region that contacts the annulus or at least one of a sealing element and the main bearing unit, the contact region arranged substantially perpendicular to the coated region.

15. The planetary transmission according to claim 1, further comprising an anti-rotation safeguard, wherein the hub nut is arranged between the anti-rotation safeguard and the annulus.

16. The planetary transmission according to claim 1, further comprising:
   an anti rotation safeguard,
   wherein the body has a receiving region that receives the anti-rotation safeguard; and
   wherein the receiving region is arranged substantially parallel to the coated region.

17. The planetary transmission according to claim 1, further comprising a sealing element arranged between the hub nut and the main bearing unit.

18. The planetary transmission according to claim 1, wherein the contact region of the body contacts the annulus.

19. The planetary transmission according to claim 1, wherein the contact region of the body contacts the a sealing element.

20. The planetary transmission according to claim 1, wherein the contact region of the body contacts the main bearing unit.

* * * * *